United States Patent
Bae et al.

(10) Patent No.: US 10,341,665 B2
(45) Date of Patent: Jul. 2, 2019

(54) METHOD OF PROVIDING RANDOM ACCESS FOR VIDEO DATA BASED ON RANDOM ACCESSIBLE P-FRAME

(71) Applicants: Hyunseong Bae, Seoul (KR); Youngju Heo, Seoul (KR); Sungjin Lee, Gwangmyeong-si (KR)

(72) Inventors: Hyunseong Bae, Seoul (KR); Youngju Heo, Seoul (KR); Sungjin Lee, Gwangmyeong-si (KR)

(73) Assignee: INNODEP Co., LTD., Seoul (KR)

( * ) Notice: Subject to any disclaimer, the term of this patent is extended or adjusted under 35 U.S.C. 154(b) by 280 days.

(21) Appl. No.: 15/486,074

(22) Filed: Apr. 12, 2017

(65) Prior Publication Data
US 2018/0131942 A1    May 10, 2018

(30) Foreign Application Priority Data
Nov. 7, 2016  (KR) .......................... 10-2016-0147274

(51) Int. Cl.
| G06K 9/36 | (2006.01) |
| H04N 19/159 | (2014.01) |
| H04N 19/172 | (2014.01) |
| H04N 19/46 | (2014.01) |
| H04N 19/70 | (2014.01) |
| H04N 19/573 | (2014.01) |

(52) U.S. Cl.
CPC ......... *H04N 19/159* (2014.11); *H04N 19/172* (2014.11); *H04N 19/46* (2014.11); *H04N 19/573* (2014.11); *H04N 19/70* (2014.11)

(58) Field of Classification Search
CPC .... H04N 19/159; H04N 19/573; H04N 19/70; H04N 19/46; H04N 19/172
See application file for complete search history.

(56) References Cited

U.S. PATENT DOCUMENTS

| 2004/0071354 A1* | 4/2004 | Adachi ................. H04N 19/46 |
| | | 382/236 |
| 2010/0154013 A1* | 6/2010 | Mas Ivars .......... H04N 7/17318 |
| | | 725/109 |

(Continued)

FOREIGN PATENT DOCUMENTS

KR    10-2015-0029398 A    3/2015

*Primary Examiner* — Howard D Brown, Jr.
(74) *Attorney, Agent, or Firm* — John K. Park; Park Law Firm

(57) ABSTRACT

The invention generally relates to a method of providing random access for video data in which a P-frame of the video data is configured to be random accessible in addition to I-frames. More specifically, the invention relates to a method of providing random access for video data in which a P-frame is configured to be random accessible based on a random access reference frame which is provided via a separate channel such as header area of video data packets or a metadata file, whereby the random access for video data may be effectively provided with overcoming the conventional video random access technology depending on the I-frame only. The invention makes it possible to configure a P-frame random accessible simply by accompanying a random access reference frame of small datasize, whereby video compression ratio may be improved due to smaller numbers of I-frames being included in video data than conventional arts.

12 Claims, 6 Drawing Sheets

(56) References Cited

U.S. PATENT DOCUMENTS

2010/0189124 A1* 7/2010 Einarsson ........ H04N 21/23424
370/432
2010/0329338 A1* 12/2010 Coban .................... H04N 19/70
375/240.15

* cited by examiner

METHOD OF PROVIDING RANDOM ACCESS FOR VIDEO DATA BASED ON RANDOM ACCESSIBLE P-FRAME

BACKGROUND OF THE INVENTION

The present invention generally relates to a method of providing random access for video data in which a P-frame of the video data may be also configured to be random accessible in addition to I-frames.

More specifically, the present invention relates to a method of providing random access for video data in which a P-frame may be also configured to be random accessible based on a random access reference frame which is provided via a separate channel such as header area of video data packets or a metadata file, whereby the random access for video data may be effectively provided with overcoming the conventional video random access technology which depending on the I-frame only.

The video compression technologies, e.g., MPEG, H.264, etc. are utilized in encoding the digital video data (i.e., moving picture) for reducing the data bitrate so as to enable the transmission of the digital video data over network medium.

In an example, the spatial redundancy is removed within a single frame in order to reduce the amount of frame data. This type of encoding is referred to as 'intraframe (i.e., I-frame)' encoding, and frame data of the intraframe encoding is referred to as 'I-frame.' That is, I-frame is a result of compressive encoding within a single frame data only. Correspondingly, an I-frame may be decoded by itself.

In another example, the temporal redundancy may be removed between frames in order to further reduce the amount of frame data. This type of encoding is referred to as 'interframe' encoding, and frame data of the interframe encoding includes P-frame (i.e., Predictive frame) and B-frame (i.e., Bidirectional Predictive frame). The P-frame is a result of compressive encoding of differential parts between the present frame and its previous frame. The B-frame is a result of compressive encoding of differential parts between the present frame and its previous and its next frames.

Correspondingly, a P-frame or B-frame may not be decoded by itself. The P-frame may be decoded with referring to its preceding I-frame as well as a series of its preceding P-frames therefrom. Similarly, the B-frame may be decoded with referring to its preceding I-frame as well as a series of preceding and trailing frames therefrom. By the way, P-frames and B-frames are much smaller than I-frames. In general, a P-frame is about 1/20 of an I-frame in datasize, and a B-frame is about 1/100 of an I-frame in datasize. Therefore, by adopting as many as P-frames and B-frames, the datasize of video data may be minimized.

FIG. 1 is a view illustrating frame format of video data of prior art. The digital broadcasting video generally includes I-frames, B-frames and P-frames. However, the present invention is directed to propose an idea of making a P-frame random accessible. For convenience of explanation only, B-frames are omitted in this specification. Therefore, the specification describes I-frames and P-frames, the present invention may be applied to video data including I-frames, B-frames and P-frames.

Referring to FIG. 1, video data includes a series of frames, in which most of the frames are P-frames 111, 112, ... with small number of I-frames 110, 120. Because I-frame may be decoded by itself, the I-frames 110, 120 are arranged in positions where random access is intended. For example, in order to make video random accessible in every second, in case of 30 FPS (Frame-Per-Second) video, an I-frame shall be arranged in every 30 frames.

As shown in FIG. 1(a), I-frames 110, 120 are random accessible because the I-frame may be decoded by itself.

However, as shown in FIG. 1(b), P-frames 111, 112, ... are random inaccessible. For example, in order to decode the P-frame 117, the video decoder shall decode not only its closest preceding I-frame 110 but also a series of its preceding P-frames 111~116 therefrom. In case of decoding a P-frame, the number of preceding P-frames to decode is variable depending on the location of the P-frame in the frame sequence, which results in ununiform decoding time. That is, uniform response time is not guaranteed for P-frames, that is why the P-frame is regarded to be random inaccessible.

By the way, an I-frame is much bigger than a P-frame in datasize. Because data compression ratio is critical in video data in view of network bandwidth and storage space, most of frames are configured in P-frames and smaller numbers of I-frames are arranged to support the random access in every 0.5 or 1.0 second.

In most of technical fields, the conventional art as described above may be adopted without any problem. Rather, it may be accepted as proper harmony of data compression ratio and random accessibility.

However, in specific fields, e.g., the security control system, the conventional art may result in unsatisfactory effect. The video taken by CCTV cameras has little change between frames in most of the time. As a result, P-frames are so tiny, and accordingly the difference in datasize between a P-frame and an I-frame is remarkable. Therefore, considering the efficiency of storage space of CCTV video, it is preferable to decrease the rate of I-frames in CCTV video.

By the way, due to the nature of security control system, the random accessibility is a crucial requirement. When a staff member urgently requests to check a specific playback point for a security purpose, the system shall provide random access to the playback point or at least just near the playback point. It would be a big problem if the system provides random access only 25 seconds before or 35 seconds after the playback point. Therefore, considering the requirement of random accessibility, it is preferable to increase the rate of I-frames in CCTV video.

Finally, in special fields, e.g., security control system, there are many difficulties in video data processing. Considering storage space for storing the massive video data from great numbers of CCTV cameras, it is preferable to decrease the rate of I-frames with mostly filling the video data with P-frames. Then, however, the random accessibility would be too poor to utilize the CCTV video at the urgent situations. That is, the CCTV video would become useless. On the contrary, if the rate of I-frames is increased in order to improve the random accessibility, the storage space shall be greatly increased too.

Due to the trade-off between random accessibility and space storage, in conventional security control systems, the I-frames are produced in CCTV video with reasonable time interval (e.g., 0.5 or 1 second) so as to make the CCTV video random accessible with the same time interval. In general, the time interval is chosen in view of the random accessibility, which imposes big burden in storage space. The burden in storage space is expected to become bigger, because there are social requirements that much more CCTV cameras must be installed and the resolution of CCTV cameras must be enhanced.

SUMMARY OF THE INVENTION

It is, therefore, an object of the present invention to provide a method of providing random access for video data in which a P-frame of the video data may be also configured to be random accessible in addition to I-frames.

More specifically, it is an object of the present invention to provide a method of providing random access for video data in which a P-frame may be also configured to be random accessible based on a random access reference frame which is provided via a separate channel such as header area of video data packets or a metadata file, whereby the random access for video data may be effectively provided with overcoming the conventional video random access technology which depending on the I-frame only.

One aspect of the present invention is to provide a method of providing random access for video data based on random accessible P-frame, wherein the video data includes a series of frame data, the method comprising: generating at least one I-frame by performing intraframe encoding on specific frame data out of the series of frame data; generating a series of P-frames by performing interframe encoding on the remaining frame data of the series of frame data with reference to each corresponding previous frame data; identifying a P-frame out of the series of P-frames as a random accessible P-frame of the video data; identifying the closest preceding I-frame for the random accessible P-frame; identifying a frame data corresponding to a predetermined spacing step from the random accessible P-frame as reference frame data; and generating a random access reference frame for the random accessible P-frame by performing interframe encoding on the reference frame data with reference to the closest preceding I-frame.

In the present invention, the method of providing random access for video data further comprises: inserting the random access reference frame in user defined fields of header area of video data packets, wherein the video data packets are prepared for transmitting the I-frame and the series of P-frames.

In the present invention, the reference frame data may be the frame data of the random accessible P-frame.

Another aspect of the present invention is to provide a method of providing random access for video data based on random accessible P-frame, wherein the video data includes at least one I-frames and a series of P-frames, the method comprising: identifying a request for random access to a random accessible P-frame in a series of P-frames; obtaining a random access reference frame from the video data for the random accessible P-frame; identifying the closest preceding I-frame for the random accessible P-frame; performing intraframe decoding on the closest preceding I-frame so as to obtain its frame data; performing interframe decoding on the random access reference frame with reference to the frame data of the closest preceding I-frame so as to obtain reference frame data; and obtaining display image of the random accessible P-frame from the reference frame data.

In the present invention, the obtaining a random access reference frame comprises: obtaining the random access reference frame for the random accessible P-frame from user defined fields of header area of packets of the video data.

In the present invention, the obtaining display image comprises: obtaining display image for the random accessible P-frame by performing playback on the reference frame data.

Further, the non-transitory computer-readable medium according to the present invention contains program code which executes the above-mentioned methods of providing random access for video data based on random accessible P-frame.

DESCRIPTION OF SPECIFIC EMBODIMENTS

Exemplary embodiments of the invention will be described below in more detail with reference to the accompanying drawings.

Figure 2:
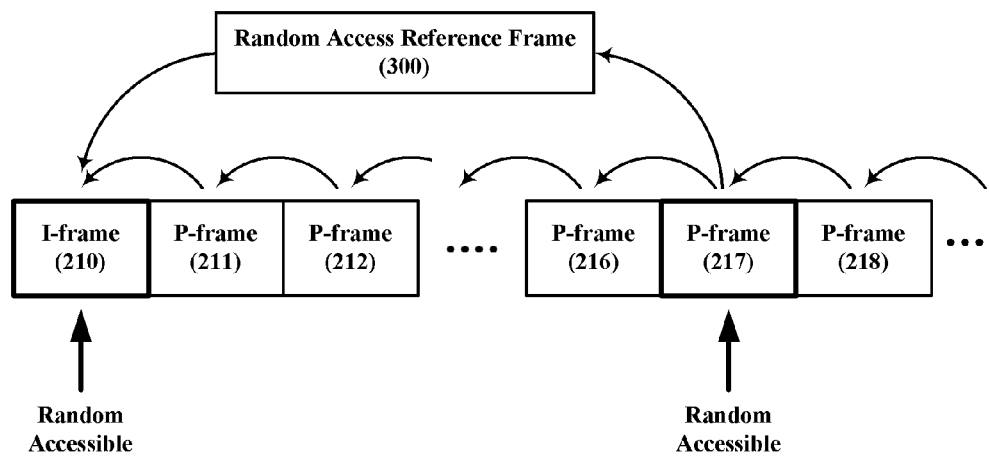
FIG. 2 is a view illustrating frame format of video data as well as random access process according to the present invention.

FIG. 2 is a view illustrating frame format of video data as well as random access process according to the present invention.

Figure 1:
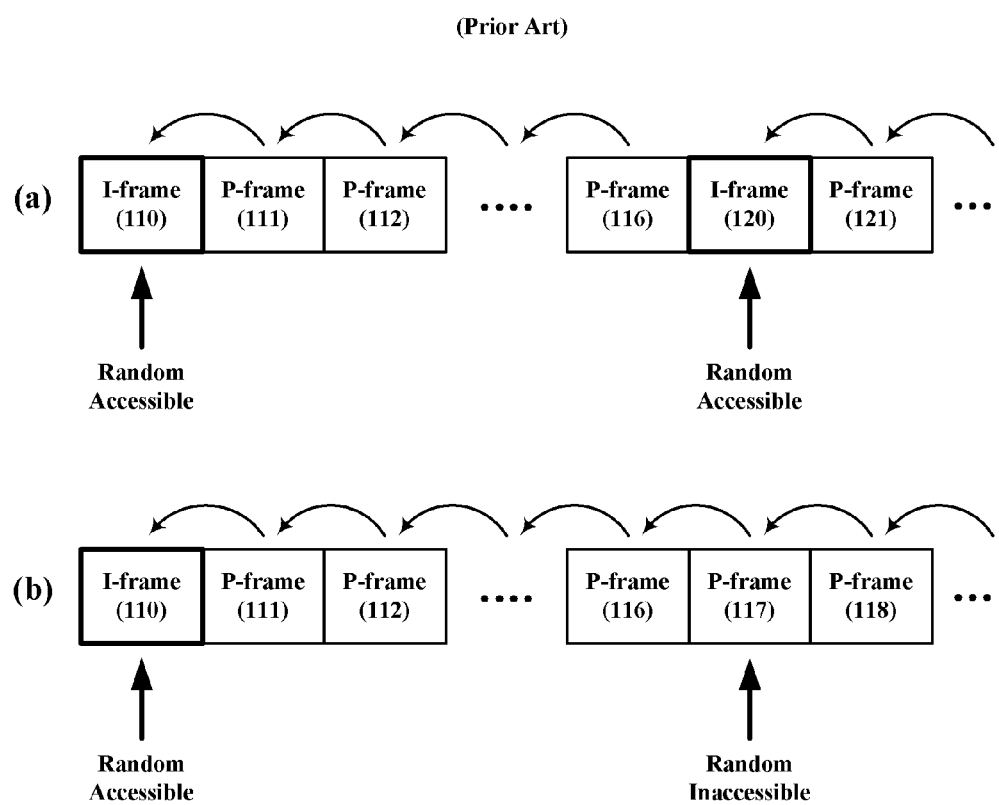
FIG. 1 is a view illustrating frame format of video data of prior art.

Comparing FIGS. 1 and 2, random access reference frame 300 is prepared in the present invention and the P-frame 217 is random accessible by utilizing the random access reference frame 300. The specific P-frame 217, which becomes to be random accessible according to the present invention, is referred as 'random accessible P-frame' in this specification.

However, the random accessible P-frame 217 itself is preferably an ordinary P-frame, similar with the other P-frames 211~216, 218. Therefore, conventional video decoding softwares, which may decode the other P-frames 211~216, 218, may also decode the P-frame 217 without problem.

In the present invention, when encoding video data, in order to make the P-frame 217 random accessible, the random access reference frame 300 is generated and then provided together with the video data. Correspondingly, when the random access to the P-frame 217 is requested in the course of decoding the video data, the P-frame 217 may be promptly decoded based on the random access reference frame 300 without decoding the series of preceding P-frames 211~216 as in prior art.

It is preferable that the random access reference frame 300 is provided via a separate channel without being mixed with the video data, whereby conventional video decoding softwares may decode the video data without problem which has been encoded in accordance with the present invention. The random access reference frame 300 may be inserted in user defined fields of header area of the video data packets. Alternatively, the random access reference frame 300 may be included in a metadata file.

The random access reference frame 300 is generated out of frame data of a specific P-frame 217 on which the random access is to be provided (i.e., the random accessible P-frame 217) as well as the closest preceding I-frame 210 of the random accessible P-frame 217.

Figure 3:
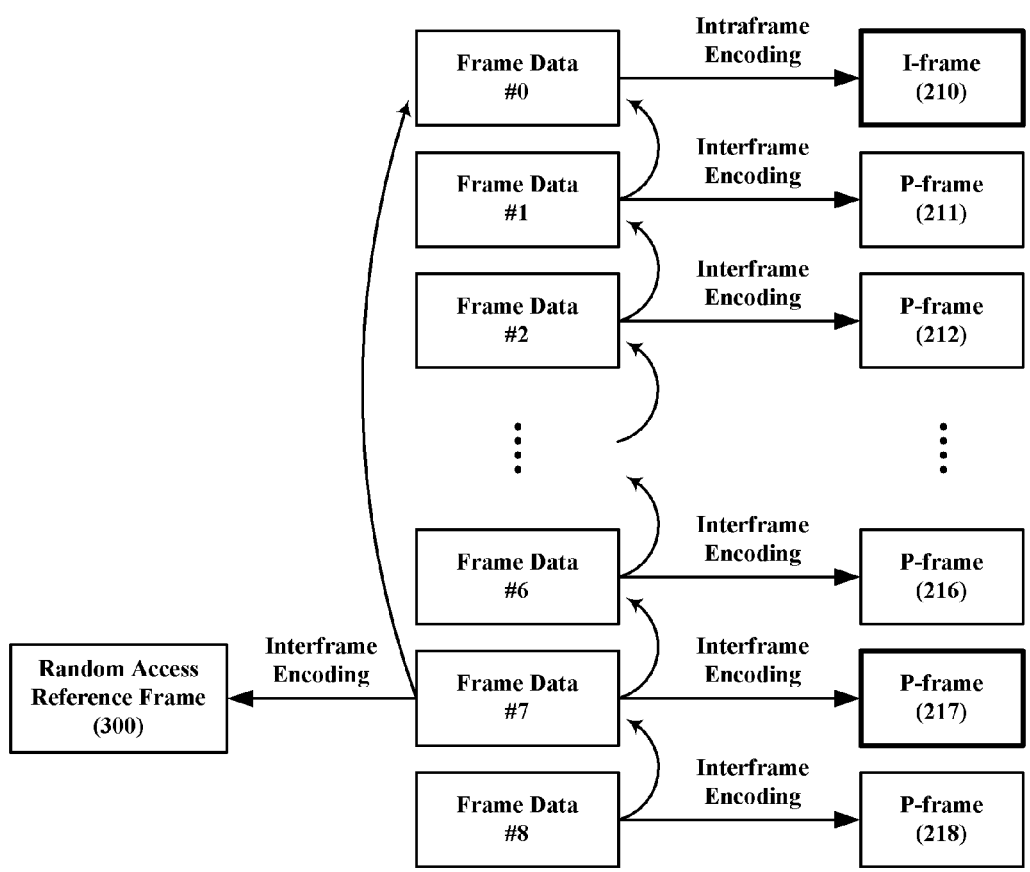
FIG. 3 illustrates an embodiment of generating the random access reference frame according to the present invention.

FIG. 3 illustrates an embodiment of generating the random access reference frame according to the present invention. Referring to FIG. 3, the I-frame 210 is generated by performing intraframe encoding on the frame data #0 only.

The series of P-frames 211~218 are generated by performing interframe encoding on the remaining frame data #1~#8 with reference to previous frame data. For example, P-frame 217 is produced by encoding the difference between its corresponding frame data #7 and its previous frame data #6. By the way, the detailed description on particular techniques for performing intraframe encoding and interframe encoding, such as Huffman coding or motion vector, shall be omitted in this specification.

In this embodiment, the random access reference frame 300 is generated in order to make the P-frame 217 random accessible. The random access reference frame 300 is produced by performing interframe encoding on the frame data #7 with reference to the frame data #0. The interframe encoding itself is preferably same that used in producing an ordinary P-frame. That is, the random access reference frame 300 is produced by encoding the difference between frame data #7 and frame data #0.

When formatting the video data as shown in FIG. 3, in addition to the I-frame 210 which is always random accessible, the P-frame 217 becomes random accessible which was conventionally random inaccessible.

When the random access to the P-frame 217 is requested, the display image of the P-frame 217 may be promptly obtained simply by decoding the closest preceding I-frame 210 and the random access reference frame 300, without sequentially decoding the series of P-frames 211~217 as in the prior art. That is, by performing intraframe decoding on the closest preceding I-frame 210 followed by performing interframe decoding on the random access reference frame 300 with reference to the I-frame 210, the frame data #7 may be obtained. The display image of the P-frame 217 may be obtained by performing playback on the frame data #7.

No matter where it is located in the frame sequence of the video data, the random accessible P-frame may be decoded always by two-step decoding, i.e., the intraframe decoding once and the interframe decoding once. That is, the present invention may guarantee uniform response time for the random accessible P-frame. Therefore, the random accessible P-frame may be regarded to be random accessible.

According to the present invention, random access may be provided at a specific playback position in video data by the combination of the P-frame 217 and the random access reference frame 300 without arranging an I-frame. Because the random access reference frame 300 is a P-frame, the datasize of the random access reference frame 300 is the same as an ordinary P-frame. Considering that a P-frame is generally about ⅟20 of an I-frame in datasize, the present invention is much more efficient in view of storage capability than the conventional art because the present invention uses one P-frame and one random access reference frame whereas the conventional art uses one I-frame.

In order to provide adequate level of random accessibility, I-frames are arranged in every 0.5 seconds in the prior art. However, according to the present invention, I-frames may be arranged more sparsely, e.g., in every 1 minute or even in every 30 minutes along with random access reference frames 300 being arranged in every 0.5 second, which may provide similar level of random accessibility.

Further, in order to increase the random accessibility, e.g., in every 0.1 second, five (5) times of I-frames shall be arranged in the prior art, which imposes significant storage burden. However, in the present invention, five (5) times of random access reference frame 300 shall be arranged. Because random access reference frame 300 is much smaller than I-frame, storage burden is far from being significant in the present invention.

Figure 4:
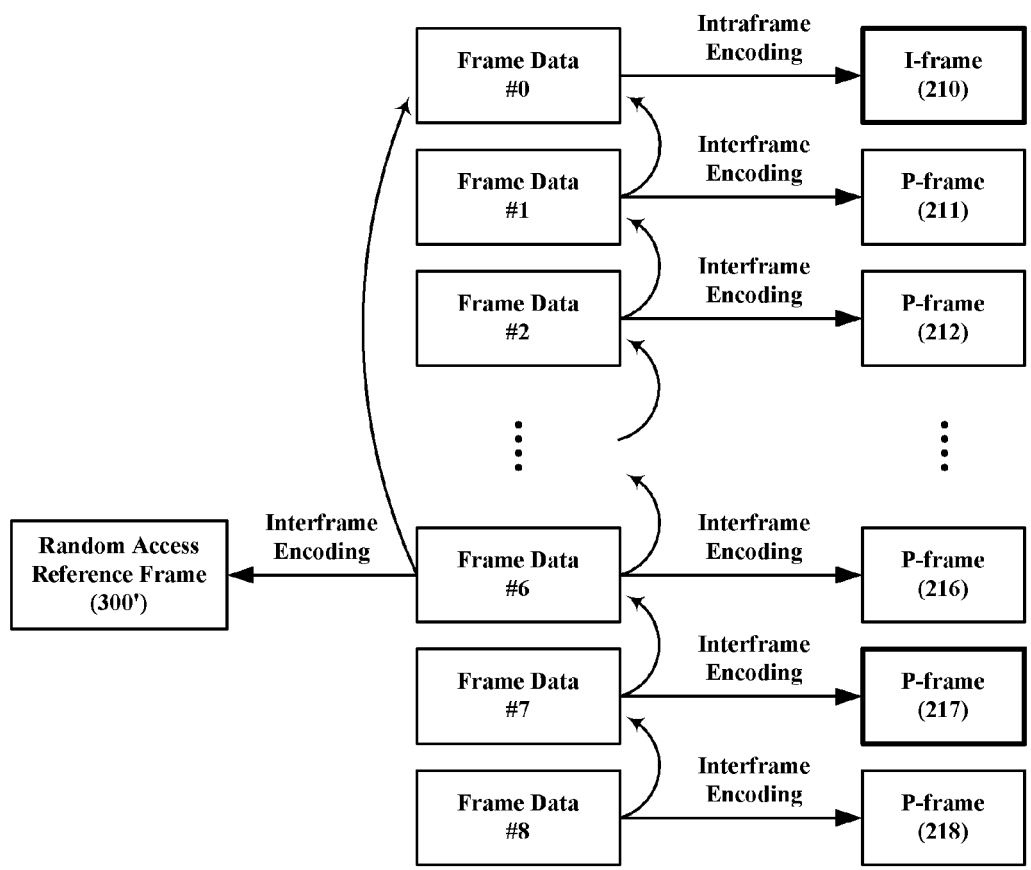
FIG. 4 illustrates another embodiment of generating the random access reference frame according to the present invention.

FIG. 4 illustrates another embodiment of generating the random access reference frame according to the present invention.

Comparing FIGS. 3 and 4, in the embodiment of FIG. 4, the random access reference frame 300' for P-frame 217 is produced by performing interframe encoding on the frame data #6 with reference to the frame data #0. However, in the embodiment of FIG. 3, the random access reference frame 300 for P-frame 217 was produced by performing interframe encoding on the frame data #7 with reference to the frame data #0.

In case that the random access reference frame 300' is produced as shown in FIG. 4, the decoding process of the random accessible P-frame 217 shall be differently implemented from what was described with referring to FIG. 3.

That is, when receiving a request of random access to the P-frame 217, the video decoder performs intraframe decoding on the closest preceding I-frame 210 followed by performing interframe decoding on the random access reference frame 300 with reference to the closest preceding I-frame 210, whereby the frame data #6 is obtained. Then, by performing interframe decoding on the P-frame 217 with reference to the frame data #6 (i.e., P-frame 216), the frame data #7 may be obtained. The display image of the P-frame 217 may be obtained by performing playback on the frame data #7.

According to the embodiment in FIG. 4, no matter where it is located in the frame sequence of the video data, the random accessible P-frame may be decoded always by three-step decoding, i.e., the intraframe decoding once and the interframe decoding twice. That is, the present invention may guarantee uniform response time for the random accessible P-frame. Therefore, the random accessible P-frame may be regarded to be random accessible.

In the present invention, the random access reference frame 300, 300' may be produced by performing interframe encoding with reference to the closest preceding I-frame of the random accessible P-frame 217 on the frame data which is corresponding to a predetermined spacing step n from the random accessible P-frame. The value of the spacing step n is 1 in the embodiment of FIG. 3, whereas the value of the spacing step n is 2 in the embodiment of FIG. 4.

Figure 5:
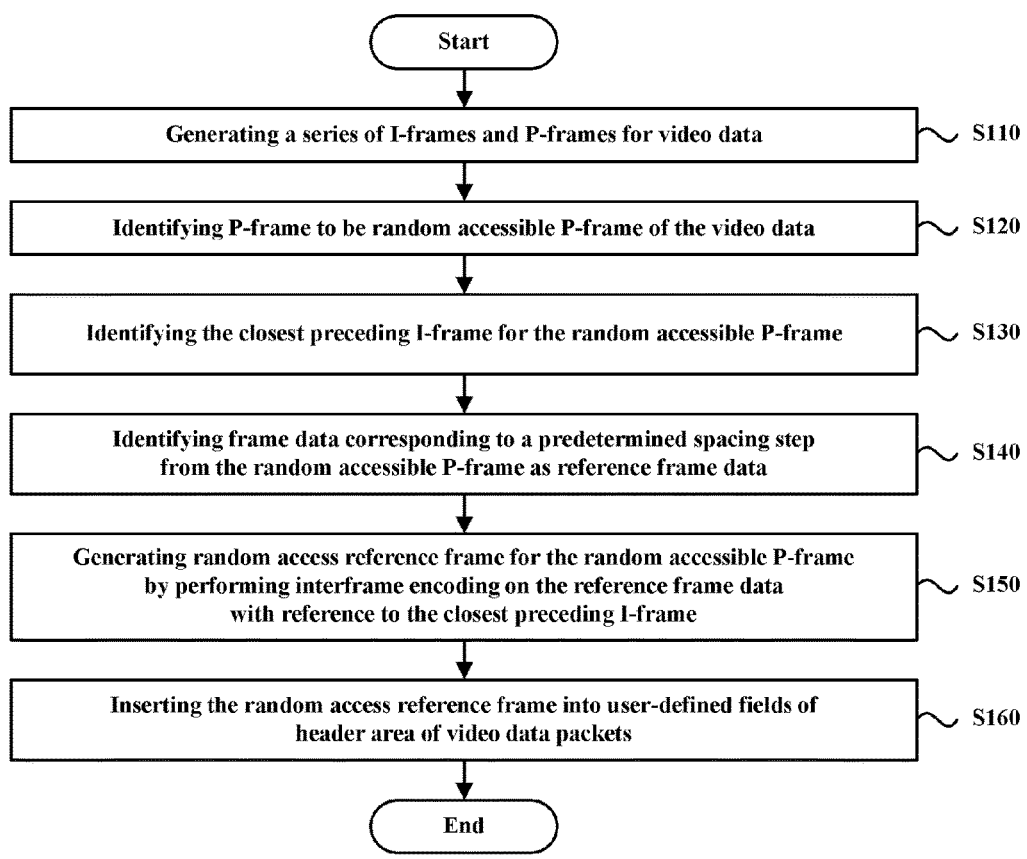
FIG. 5 is a flowchart illustrating the procedure of generating the random accessible P-frame according to the present invention.

FIG. 5 is a flowchart illustrating the procedure of generating the random accessible P-frame according to the present invention. The video data includes a series of frame data #0~#8 which are uncompressed data in general. FIG. 5 is related to a procedure for video encoder to perform in order to provide random access with compressing the series of frame data into a sequence of I-frames and P-frames.

First, the video encoder generates at least one I-frame 210 by performing intraframe encoding on a specific frame data #0 out of the series of frame data #0~#8 (S110).

Then, the video encoder generates a series of P-frames 211~218 by performing interframe encoding on the remaining frame data #1~#8 with reference to each corresponding previous frame data. For example, P-frame 212 is generated by performing interframe encoding on frame data #2 with reference to its previous frame data #1.

Through the above-mentioned procedure, the video encoder may generate a sequence of compressed video data 210~218, i.e., I-frame and P-frames, out of a series of uncompressed frame data #0~#8.

The video encoder identifies a P-frame 217 out of the series of P-frames 211~218 as a random accessible P-frame of the video data (S120). That is, a P-frame is selected out of the series of frame data #0~#8 so as to make the selected P-frame to be random accessible. For example, in order to make it random accessible every 0.3 second in video data of 30 FPS, a random accessible P-frame is configured every nine (9) frames.

As described above with reference to FIG. 1, the P-frame 217 was random unaccessible in the prior art. In the present invention, in order to make the above-identified P-frame 217 to be random accessible, the video encoder generates a specifically-configured random access reference frame 300 for the random accessible P-frame 217 and then inserts the random access reference frame 300 into the video data.

First, the video encoder identifies the closest preceding I-frame 210 for the random accessible P-frame 217 (S130). The closest preceding I-frame 210 was also referenced for decoding the P-frame 217 in the prior art.

Then, the video encoder identifies frame data which is located corresponding to a predetermined spacing step from the random accessible P-frame 217, and set the identified frame data as the reference frame data (S140). In the embodiment of FIG. 3, the reference frame data is configured as the frame data #7 of the random accessible P-frame 217, which may provide the fastest random access. Further, in the embodiment of FIG. 4, the reference frame data is configured as the frame data #6 of the previous P-frame 216 of the random accessible P-frame 217, which may provide rather slow random access.

Then, the video encoder performs interframe encoding on the reference frame data (e.g., frame data #7) with reference to frame data #0 of the closest preceding I-frame 210 so as to generate a random access reference frame 300 for the random accessible P-frame 217 (S150). It is preferable that conventional interframe encoding is utilized in producing the random access reference frame 300 which was also used in producing a conventional P-frame.

The video encoder transmits the random access reference frame 300 via a separate channel so as to prevent the random access reference frame 300 from being mixed with video data, e.g., the I-frame 210 and the series of P-frames 211~218 (S160). This constitution is devised so that conventional video decoding softwares may decode the video data without problem which has been encoded in accordance with the present invention. It is preferable that the random access reference frame 300 is inserted in user defined fields of header area of video data packets. Alternatively, the random access reference frame 300 may be included in a metadata file.

Figure 6:
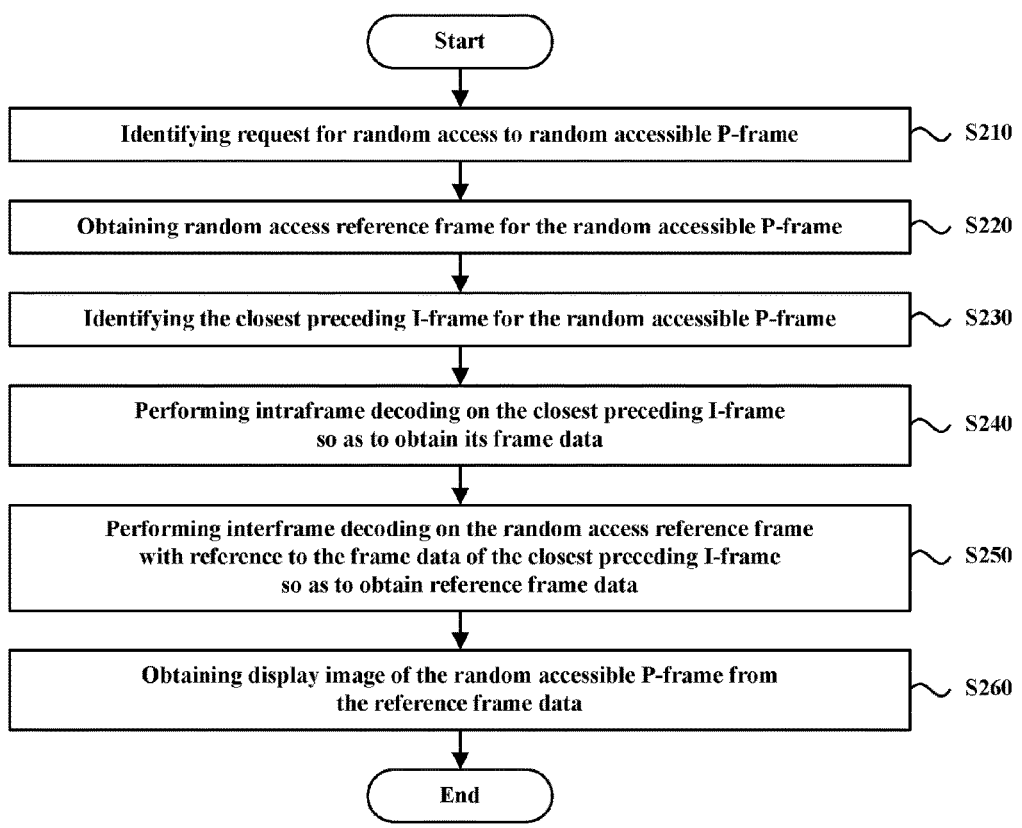
FIG. 6 is a flowchart illustrating the procedure of providing random access utilizing the random accessible P-frame according to the present invention.

FIG. 6 is a flowchart illustrating the procedure of providing random access utilizing the random accessible P-frame according to the present invention. When video data is received which has been produced by a video encoder by the procedure as shown in FIG. 5, the video decoder accomplishes random access by the procedure as shown in FIG. 6. That is, FIG. 6 illustrates a procedure by which the video decoder accomplishes random access for video data of a sequence of I-frames 210 and P-frames 211~218.

First, the video decoder identifies a request for random access to a random accessible P-frame 217 in a series of P-frames 211~218 (S210). In an embodiment, a user operates a mouse click on User Interface (UI) of video decoding software for requesting video playback at a specific time. Accordingly, the video decoder is to random access the random accessible P-frame 217 about the requested playback position.

The video decoder obtains a random access reference frame 300 from the video data for the random accessible P-frame 217 (S220). As described above, the video encoder transmits the random access reference frame 300 for the random accessible P-frame 217 via a separate channel, preferably by inserting the random access reference frame 300 into user defined fields of header area of video data packets. Accordingly, the video decoder may obtain the random access reference frame 300 for the random accessible P-frame 217 from user defined fields of header area of packets of the video data.

The video decoder identifies the closest preceding I-frame 210 for the random accessible P-frame 217, and then performs intraframe decoding on the closest preceding I-frame 210 so as to obtain its frame data #0 (S230, S240).

Then, the video decoder performs interframe decoding on the random access reference frame 300 with reference to the frame data #0 of the closest preceding I-frame 210, by which reference frame data (e.g., frame data #7) is obtained (S250). The step of (S250) corresponds to reversal or restoration of the interframe encoding procedure which has been described in (S150) of FIG. 5.

The video decoder obtains display image of the random accessible P-frame 217 from the reference frame data (e.g., frame data #7) (S260).

In the embodiment shown in FIG. 3, the reference frame data obtained in (S250) is the frame data #7 of the random accessible P-frame 217. Accordingly, (S260) may comprise obtaining the display image of the random accessible P-frame 217 by performing playback on the reference frame data #7 obtained in (S250).

Further, in the embodiment shown in FIG. 4, the reference frame data obtained in (S250) is the frame data #6 of the previous P-frame 216 of the random accessible P-frame 217. Accordingly, (S260) may comprise performing interframe decoding on the random accessible P-frame 217 with reference to the reference frame data #6 obtained in (S250) so as to obtain the frame data #7, and obtaining the display image of the random accessible P-frame 217 by performing playback on the frame data #7.

As described above, the method of providing random access for video data according to the present invention provides the following effects.

The present invention makes it possible to configure a P-frame random accessible simply by accompanying a random access reference frame of small datasize, whereby video compression ratio may be improved due to smaller numbers of I-frames being included in video data than conventional arts.

The invention can also be embodied as computer readable codes on a non-transitory computer-readable medium. The non-transitory computer-readable medium is any data storage device that can store data which may be thereafter read by a computer system, which include read-only memory (ROM), random-access memory (RAM), CD-ROMs, magnetic tapes, floppy disks, and optical data storage devices. The non-transitory computer-readable medium can also be distributed over network coupled computer systems so that the computer readable code is stored and executed in a distributed fashion.

What is claimed is:

1. A method of providing random access for video data based on random accessible P-frame, wherein the video data includes a series of frame data, the method comprising:

generating at least one I-frame by performing intraframe encoding on specific frame data out of the series of frame data;

generating a series of P-frames by performing interframe encoding on the remaining frame data of the series of frame data with reference to each corresponding previous frame data;

identifying a P-frame out of the series of P-frames as a random accessible P-frame of the video data;

identifying the closest preceding I-frame for the random accessible P-frame;

identifying a reference frame data by a frame data corresponding to a predetermined spacing step from the random accessible P-frame;

generating a random access reference frame for the random accessible P-frame by performing interframe encoding on the reference frame data with reference to the closest preceding I-frame; and inserting the random access reference frame in user defined fields of header area of video data packets, wherein the video data packets are prepared for transmitting the I-frame and the series of P-frames.

2. The method according to the claim 1, wherein the reference frame data is identified by the frame data of the previous frame of the random accessible P-frame.

3. The method according to the claim 1, wherein the reference frame data is the frame data of the random accessible P-frame.

4. A method of providing random access for video data based on random accessible P-frame, wherein the video data includes at least one I-frames and a series of P-frames, the method comprising:

identifying a request for random access to a random accessible P-frame in a series of P-frames;

obtaining a random access reference frame for the random accessible P-frame out of user defined fields of header area of packets of the video data;

identifying the closest preceding I-frame for the random accessible P-frame;

performing intraframe decoding on the closest preceding I-frame so as to obtain its frame data;

performing interframe decoding on the random access reference frame with reference to the frame data of the closest preceding I-frame so as to obtain reference frame data; and obtaining display image of the random accessible P-frame from the reference frame data.

5. The method according to the claim 4, wherein the obtaining display image comprises:

performing interframe decoding on the random accessible P-frame with reference to the reference frame data so as to a display frame data; and obtaining the display image for the random accessible P-frame by performing playback on the display frame data.

6. The method according to the claim 4, wherein the obtaining display image comprises:

obtaining display image for the random accessible P-frame by performing playback on the reference frame data.

7. A non-transitory computer-readable medium containing program code which executes a method of providing random access for video data based on random accessible P-frame, the method comprising:

generating at least one I-frame by performing intraframe encoding on specific frame data out of the series of frame data;

generating a series of P-frames by performing interframe encoding on the remaining frame data of the series of frame data with reference to each corresponding previous frame data;

identifying a P-frame out of the series of P-frames as a random accessible P-frame of the video data;

identifying the closest preceding I-frame for the random accessible P-frame;

identifying a reference frame data by a frame data corresponding to a predetermined spacing step from the random accessible P-frame, generating a random access reference frame for the random accessible P-frame by performing interframe encoding on the reference frame data with reference to the closest preceding I-frame; and inserting the random access reference frame in user defined fields of header area of video data packets, wherein the video data packets are prepared for transmitting the I-frame and the series of P-frames.

8. The non-transitory computer-readable medium according to claim 7, wherein the reference frame data is identified by the frame data of the previous frame of the random accessible P-frame.

9. The non-transitory computer-readable medium according to the claim 7, wherein the reference frame data is the frame data of the random accessible P-frame.

10. A non-transitory computer-readable medium containing program code which executes a method of providing random access for video data based on random accessible P-frame, the method comprising:

identifying a request for random access to a random accessible P-frame in a series of P-frames;

obtaining a random access reference frame for the random accessible P-frame out of user defined fields of header area of packets of the video data;

identifying the closest preceding I-frame for the random accessible P-frame;

performing intraframe decoding on the closest preceding I-frame so as to obtain its frame data;

performing interframe decoding on the random access reference frame with reference to the frame data of the closest preceding I-frame so as to obtain reference frame data; and obtaining display image of the random accessible P-frame from the reference frame data.

11. The non-transitory computer-readable medium according to the claim 10, wherein the obtaining display image comprises:

performing interframe decoding on the random accessible P-frame with reference to the reference frame data so as to a display frame data; and obtaining display image for the random accessible P-frame by performing playback on the display frame data.

12. The non-transitory computer-readable medium according to the claim 10, wherein the obtaining display image comprises:

obtaining display image for the random accessible P-frame by performing playback on the reference frame data.

* * * * *